United States Patent [19]

Hanaoka

[11] Patent Number: 4,471,363

[45] Date of Patent: Sep. 11, 1984

[54] METHOD AND APPARATUS FOR DRIVING AN INK JET PRINTER HEAD

[75] Inventor: Seiji Hanaoka, Shiojiri, Japan

[73] Assignees: Epson Corporation, Nagana; Kabushiki Kaisha Suwa Seikosha, Tokyo, both of Japan

[21] Appl. No.: 295,968

[22] Filed: Aug. 25, 1981

[30] Foreign Application Priority Data

| | | | |
|---|---|---|---|
| Aug. 25, 1980 | [JP] | Japan | 55-116726 |
| Sep. 29, 1980 | [JP] | Japan | 55-135622 |
| Dec. 24, 1980 | [JP] | Japan | 55-183410 |

[51] Int. Cl.[3] ..... G01D 15/18

[52] U.S. Cl. ..... 346/140 R

[58] Field of Search ..... 346/140 PD, 75

[56] References Cited

U.S. PATENT DOCUMENTS

| | | | |
|---|---|---|---|
| 3,946,398 | 3/1976 | Kyser et al. | 346/1 |
| 4,005,435 | 1/1977 | Lundquist et al. | 346/75 X |
| 4,161,670 | 7/1979 | Kern | 310/317 |
| 4,245,224 | 1/1981 | Isayama et al. | 346/140 PD X |
| 4,266,232 | 5/1981 | Juliana Jr. et al. | 346/140 PD |
| 4,282,535 | 8/1981 | Kern et al. | 346/140 PD |
| 4,290,074 | 9/1981 | Royer | 346/75 |
| 4,323,908 | 4/1982 | Lee et al. | 346/140 PD |
| 4,339,763 | 7/1982 | Kyser et al. | 346/140 PD |

*Primary Examiner*—George H. Miller, Jr.

[57] ABSTRACT

In the demand-type ink jet printer head driving method and apparatus a predetermined voltage is applied to an electromechanical conversion device in a preliminary step to displace the wall of an ink pressure chamber inwardly. This decreases the volume of the pressure chamber without ejecting ink from the nozzle. The applied voltage is removed to restore the wall of the pressure chamber by means of the elastic energy stored in the wall and in the electro-mechanical conversion means thereby drawing ink into the pressure chamber from an ink reservoir container. Voltage is applied a second time to the electro-mechanical conversion device in synchronism with a damped oscillation system comprised of the pressure chamber wall, the electro-mechanical conversion means, and ink. The second application of voltage in synchronism with the damped oscillation displaces the electro-mechanical conversion means inwardly so that an ink droplet is ejected from the nozzle.

25 Claims, 21 Drawing Figures

FIG. 3
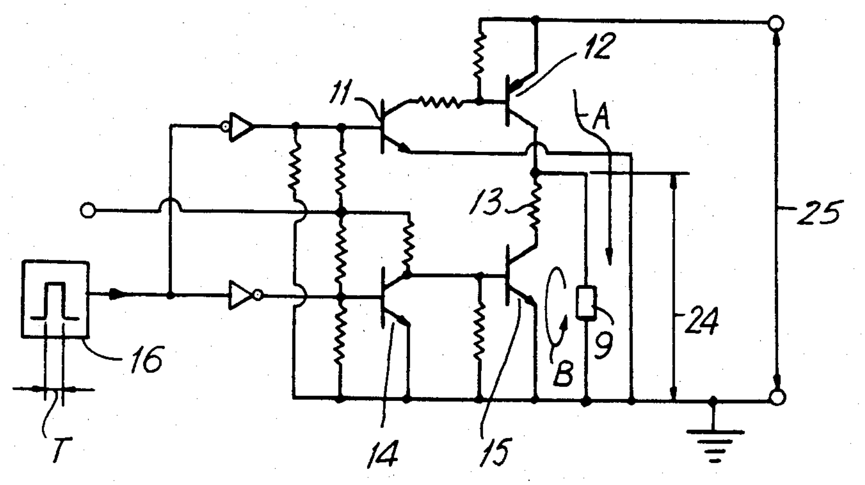
FIG. 4A
FIG. 4B
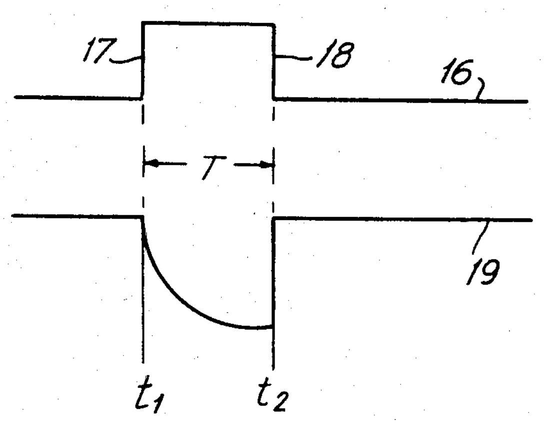

FIG. 8
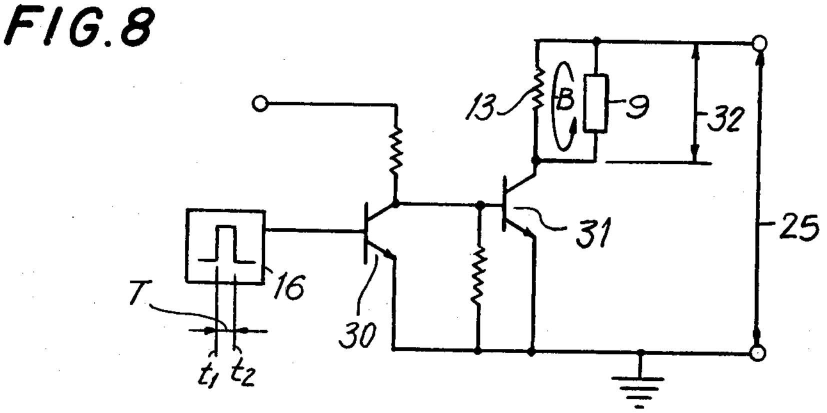
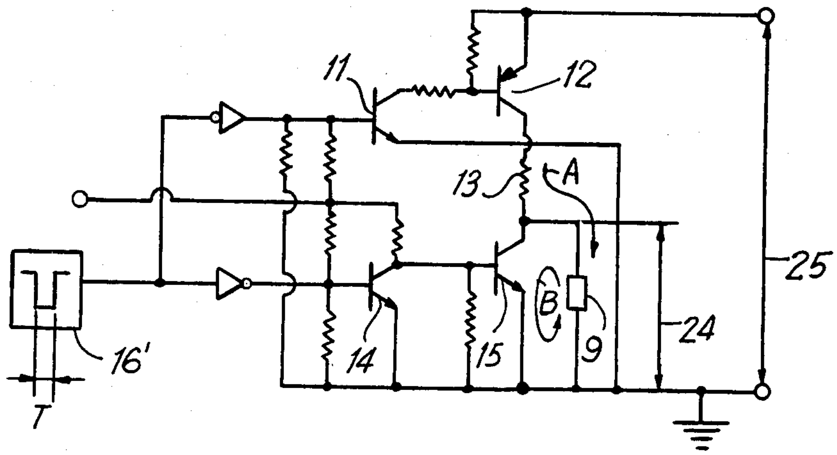
FIG. 9
FIG. 10A
FIG. 10B
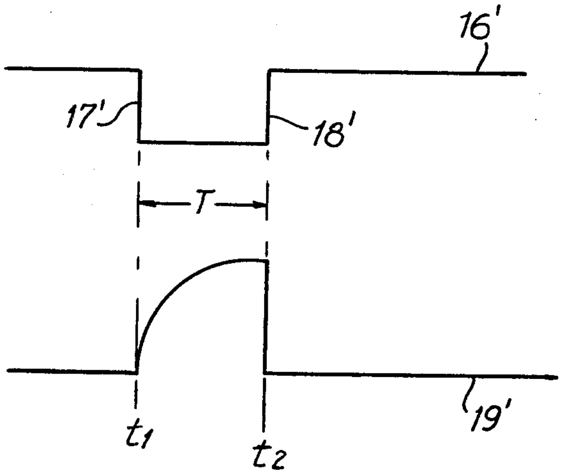

FIG. 11A
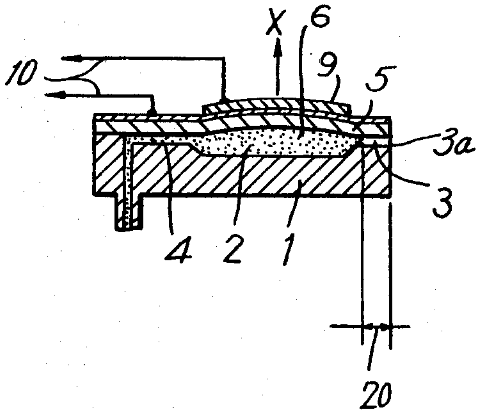
FIG. 11B
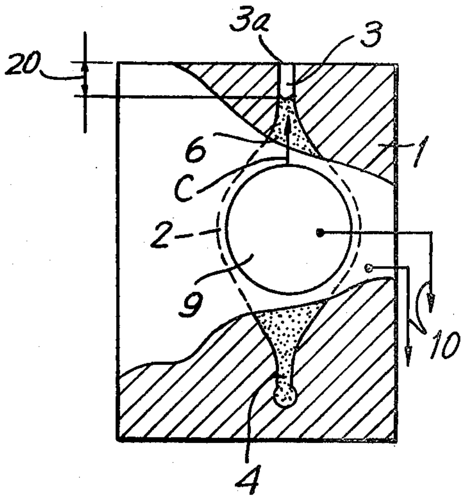
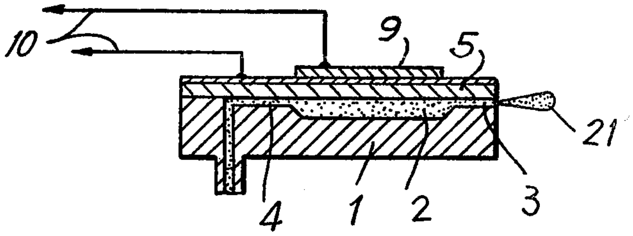
FIG. 12

METHOD AND APPARATUS FOR DRIVING AN INK JET PRINTER HEAD

BACKGROUND OF THE INVENTION

This invention relates generally to a method and apparatus for driving a non-impact type printer and more particularly, to a method and apparatus for driving an ink-on-demand type ink jet printer head operating with low voltage input. In a prior demand-type ink jet head driving method as disclosed in the U.S. Pat. No. 4,161,670, a voltage of a polarity opposite to the polarity of the polarization voltage of a piezoelectric element is applied to the element to maintain the wall of a pressure chamber in such a condition that the volume of the pressure chamber is increased. After a predetermined period of time, the polarity of the voltage applied to the piezoelectric element is inverted to thereby reduce the previously enlarged volume of the pressure chamber. Thereby an ink droplet is ejected from the nozzle of the printer head. A voltage transformer is employed to invert the polarity of the applied voltage. A secondary inductance of the voltage transformer forms an oscillating circuit with the capacitance of the piezoelectric element. The resonant frequency of the oscillating circuit is set equal to the mechanical resonant frequency of the column of ink and the period of primary current impact is equal to half of the period of the resonant frequency.

For implementing such a driving method of the prior art, a separate voltage transformer and control circuit are necessary for each nozzle. Therefore, in the case of a multi-nozzle type ink jet head, the total cost of the assembly is quite high because it is necessary to provide as many voltage transformers and control circuits are there are nozzles.

However, to reach the maximum efficiency for which the highest velocity of ink droplets is obtained with the lowest voltage, the period of the primary current impact should not be the same as a half period of the resonant frequency of the column of ink as in the prior art, for the following reasons. The oscillation of the ink column is a transient response to the primary current impact of the voltage transformer in a system composed of a wall of the pressure chamber, the piezoelectric element and the ink itself. Accordingly, the mechanical/hydraulic oscillation is a damped oscillation involving a phase lag related to the driving waveform applied to the piezoelectric element. Therefore, the instantaneous time when the increased volume of the pressure chamber is decreased by changing the polarity of the voltage applied to the piezoelectric element, should be selected to occur in correspondence with the phase of the damped mechanical hydraulic oscillation, taking account of the phase lag of the column of ink to obtain the above described maximum efficiency. In other words, when the period of the primary current impact of the voltage transducer is not set equal to a half period of the resonant frequency of the column of ink, but is set to coincide with an optimum phase of the actual damping oscillation of the column of ink in the pressure chamber and the nozzle, the ink droplets can be jetted with a low voltage.

It has been confirmed through experiments that the period of the above described current impact for maximum efficiency of operation is longer than the half period of the natural frequency of the column of ink, chamber and piezoelectric element. With this method, the magnitude of voltage which is applied to the piezoelectric element to modify the volume of the pressure chamber is reduced. Therefore, as the applied voltage decreases, the piezoelectric element is better protected from depolarization.

What is needed is a method and apparatus for driving an ink jet printer head having high efficiency and using low voltage.

SUMMARY OF THE INVENTION

In accordance with the invention, a method and apparatus for driving an ink jet printer head especially suitable for efficient production of high velocity ink droplets is provided. In the demand-type ink jet printer head driving method and apparatus of this invention a predetermined voltage is applied to an electro-mechanical conversion device, such as the piezoelectric element in a preliminary step to displace the wall of an ink pressure chamber inwardly. This decreases the volume of the pressure chamber without ejecting ink from the nozzle. The applied voltage is removed after a predetermined time to restore the wall of the pressure chamber by means of the elastic energy stored in the wall and in the electro-mechanical conversion means. This draws ink into the pressure chamber from an ink reservoir container. The voltage is applied a second time to the electro-mechanical conversion device in synchronism with a damped oscillation of an oscillating system comprised of the wall of the pressure chamber, the electro-mechanical conversion means, and the ink. The second application of voltage in synchronism with the damped oscillation displaces the electro-mechanical conversion means inwardly so that volume of the pressure chambers is abruptly reduced and an ink droplet is ejected from the nozzle.

In an alternative method and apparatus for driving an ink jet printer head in accordance with this invention, a preselected voltage is applied to an electro-mechanical conversion means, such as a peizoelectric element, to outwardly displace the wall of a pressure chamber thereby increasing the volume of the pressure chamber. Then, ink is drawn to the pressure chamber from an ink container as a result of the increasing volume of the chamber. After a period of time, the applied voltage is removed in synchronization with the damped oscillation of an oscillation system comprising the wall of the pressure chamber, the electro-mechanical conversion means, and the ink. Release of the applied voltage in synchronism with the oscillation restores the wall of the pressure chamber to its normal state and in the process an ink droplet is ejected from the nozzle. Preferably, the voltage applied to the electro-mechanical conversion device is suspended approximately at the time when the damped oscillation reaches a maximum value of displacement. At that time, the flow of air toward the pressure chamber through the nozzle also reaches its maximum value.

In both embodiments the applied voltage is less than that required for ejection of droplets in the prior art methods of ejection.

Accordingly, it is an object of this invention to provide an improved method and apparatus for driving an ink jet printer head which outputs ink droplets at a desired velocity using a low drive voltage.

Another object of this invention is to provide an improved method and apparatus for an ink jet printer head which ejects ink droplets by means of a voltage signal applied in delayed synchronization with the mechanical/hydraulic osicllation of the ink system.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is an electronic circuit for driving an ink jet printer head in accordance with this invention;

FIG. 4A is a timing diagram of an input signal to drive the circuit of FIG. 3;

FIG. 4B is the waveform of voltage across a piezoelectric element in the ink jet printer head of FIGS. 1 and 2;

FIG. 8 is schematic of an alternative embodiment of a driving circuit for an ink jet printer head in accordance with this invention;

FIG. 9 is a schematic diagram of another alternative embodiment of a drive circuit for the ink jet printer head in accordance with this invention;

FIG. 10A is a diagram showing an input signal to drive the circuit of FIG. 9;

FIG. 10B is a waveform diagram of a voltage across the piezoelectric element in the ink jet printer head in accordance with this invention and FIG. 9.

FIG. 11A is a side sectional view of the ink jet printer head in accordance with this invention wherein ink has been drawn into the pressure chamber operated on by the circuit of FIG. 9;

FIG. 11B is a top view, with portions cut away, to a larger scale, of the ink jet printer head of FIG. 11A;

FIG. 12 is a side sectional view of the ink jet printer head of FIG. 11A jetting an ink droplet;

DESCRIPTION OF THE PREFERRED EMBODIMENTS

Figure 1:
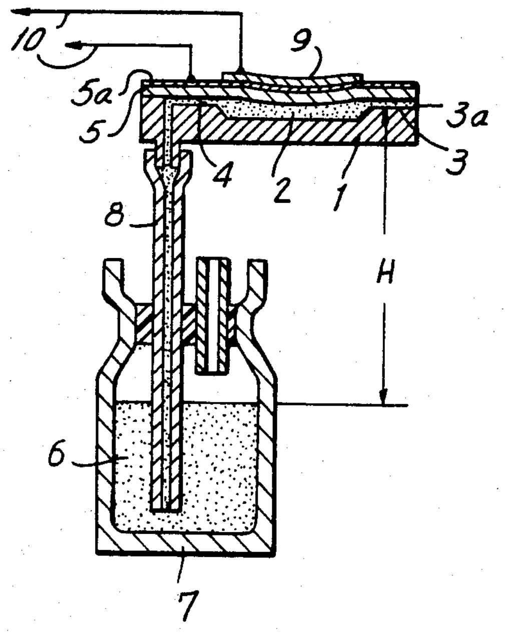
FIG. 1 is a side sectional view, functionally showing an ink jet printer head and associated ink supply to which the method and apparatus of this invention is applicable.
Figure 2:
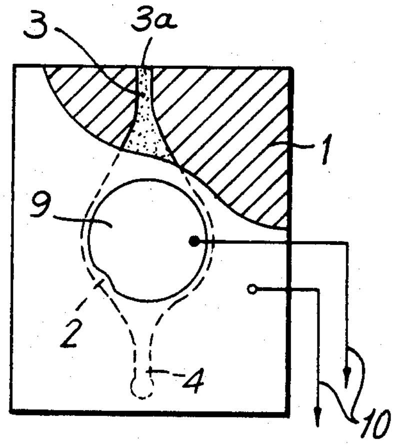
FIG. 2 is a top view to a larger scale, with a portion cut away of the ink jet printer head of FIG. 1.

With reference to FIGS. 1 and 2, the ink jet printer head in accordance with this invention includes a pressure chamber 2, a nozzle 3 and a supply port 4 provided in the form of a recess in a substrate 1. Ink from an ink container 7 is introduced through an ink supply tube 8 and the supply port 4 which forms a narrow path to the pressure chamber 2 and the connected nozzle 3. In the opening or mouth 3*a* of the nozzle 3, surface tension of the ink 6 is in balance with the negative pressure head H so that the ink 6 remains in the nozzle 3.

An electrode layer of surface 5*a* is formed on a wall 5 using a vacuum evaporation technique, or the like. The wall 5 in association with the recessed substrate 1 forms the enclosed pressure chamber 2, port 4 and nozzle 3. A piezoelectric element 9, which is an electromechanical conversion device, is bonded to the electrode layer 5*a* of the wall 5 at a position facing the pressure chamber 2 through the wall 5.

Lead wires 10 connect to the piezoelectric element 9 and to electrode layer 5*a* respectively. The polarities of the lead wires 10 are so selected that the piezoelectric element 9 contracts radially in such a manner as to bend the wall 5. The wall 5 becomes substantially concave, thereby decreasing the internal volume of the pressure chamber 2 as seen in FIG. 1. That is, a voltage applied to the piezoelectric element 9 is forward in polarity to the polarization voltage of the piezoelectric element 9.

FIG. 3 is a schematic diagram of a drive circuit for supplying electrical pulses to the piezoelectric element 9. FIG. 4A shows the waveform of an input signal 16 which is applied to the drive circuit so as to produce pulses for flexing the piezoelectric element 9 and wall 5.

Prior to the instantaneous time $t_1$, a transistor 11 and a transistor 12 are conductive, that is, ON, and as a result of this conduction current flows in the direction indicated by the arrow A to charge the piezoelectric element 9. The piezoelectric element 9 on the wall 5 of the ink jet printer head in accordance with this invention functions as a capacitor in the circuit of FIG. 3. With the capacitor/piezoelectric element 9 fully charged, the wall 5 is held in the inwardly flexed state as shown in FIG. 1.

In this step of charging the capacitor 9, current flows so as to bypass a circuit resistor 13. The waveform 19 of the voltage applied across the piezoelectric element 9 is shown in FIG. 4B and by the reference numeral 24 in the circuit of FIG. 3. As stated, with the capacitor 9 fully charged prior to the time $t_1$, the waveform 19 is at its maximum value approximately equal to the voltage source 25 which is applied to the circuit of FIG. 3.

At instantaneous time $t_1$, the input signal 16 rises as shown by the leading edge 17. In response thereto, a transistor 14 which had been conductive is rendered non-conductive, while a transistor 15 which had been non-conductive is rendered conductive. The transistors 11,12 which had been conducting are turned OFF. As a result, the electrical charge stored in the piezoelectric element/capacitor 9 flows as a current in the direction indicated by the arrow B through the transistor 15 and the resistor 13. The waveform 19 of the voltage, corresponding to the voltage between the circuit points indicated by the reference numeral 24 in FIG. 3 as stated above, across the piezoelectric element 9 is shown in FIG. 4B. It can be seen that the voltage drops off in a typical RC characteristic.

At the time $t_2$, the input signal 16 falls as indicated by the trailing edge 18 and the transistors 14,15 are turned ON and OFF respectively. The transistors 11,12 are turned ON, causing an instantaneous current in the direction of the arrow A. As a result of this instantaneous current flow, the piezoelectric element is instantly charged through a current path which bypasses the resistor 13. The voltage 24 across the piezoelectric element 9 rises, as stated, instantaneously, to be substantially the same as the source voltage 25.

The mechanical/hydraulic operation which accompanies the above described electrical operation is described with reference to FIGS. 1,5A,5B and 6. As previously stated, the transistors 11,12 are conductive when the power source 25 is connected to the circuit of FIG. 3. Accordingly, current flows in the direction of the arrow A and charging of the piezoelectric element 9 is begun. Upon completion of the charging of the piezoelectric element 9, which occurs substantially instantaneously, the voltage 24 across the element 9 is substantially equal to the source voltage 25. The voltage 24 is maintained at that level as illustrated in the period prior to $t_1$. Therefore, the piezoelectric element 9 is held in a radially contracted state and the wall 5 of the pressure chamber 2 is flexed to reduce the volume of the pressure chamber 2 as shown in FIG. 1.

Figure 5A:
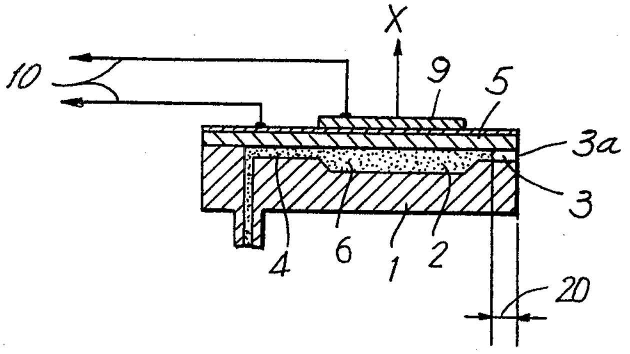
FIG. 5A is a side sectional view of the ink jet printer head of FIG. 1 after ink has been drawn into the pressure chamber.
Figure 5B:
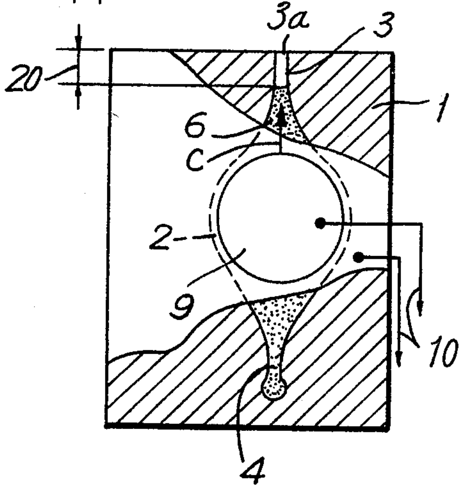
FIG. 5B is a top view, with a portion cut away, to an enlarged scale of the ink jet printer head in FIG. 5A.

At the instantaneous time $t_1$, the discharging of the piezoelectric element 9 begins, causing the element to return to its original state as a result of the elastic energy stored in the wall 5 and in piezoelectric element 9. In this operation of unflexing of the piezoelectric element and wall, ink 6 from the ink container 7 is drawn in through the supply port 4 while air is drawn in through the opening 3*a* in the nozzle 3. As a result of these actions, a condition as shown in FIGS. 5A and 5B is reached. The distance from the discharge opening 3*a* of the nozzle 3 to the meniscus of the ink 6 is indicated with a reference numeral 20.

Figure 6:
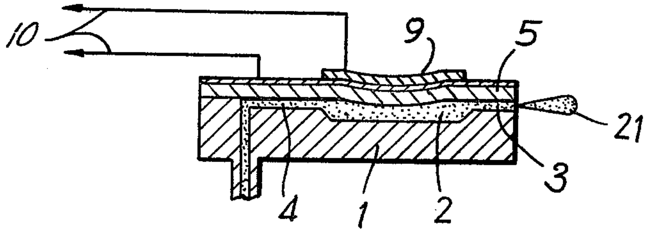
FIG. 6 is a side sectional view of the ink jet printer head of FIG. 5A while jetting an ink droplet from the nozzle.

The instantaneous time $t_2$ is selected so that it occurs approximately when the amount (20) of air drawn in is a maximum as described more fully hereinafter. By applying the voltage across the piezoelectric element 9 for a second time at the instantaneous time $t_2$, the piezoelectric element 9 charges nearly instantaneously through the transistor 12 and the piezoelectric element 9 is quickly contracted to reduce the volume of the pressure chamber 2 as shown in FIG. 6. As a result, ink 6 is discharged from the opening 3*a* in the nozzle 3 in the form of an ink droplet 21.

Figure 7A:
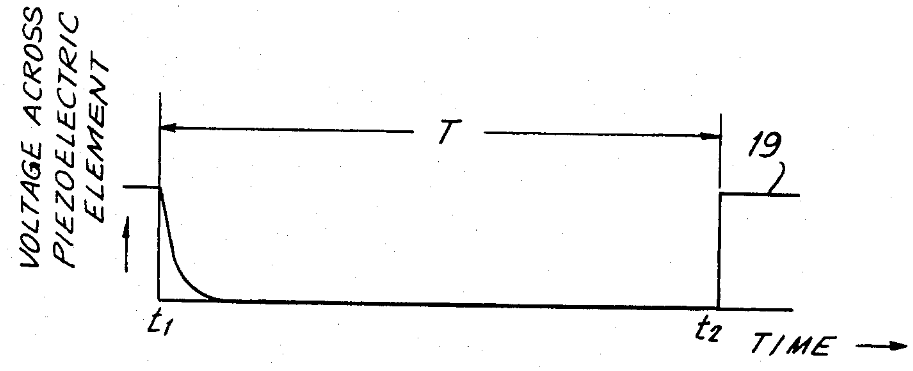
FIG. 7A shows the voltage waveform across the piezoelectric element of the ink jet printer head in accordance with this invention.
Figure 7B:
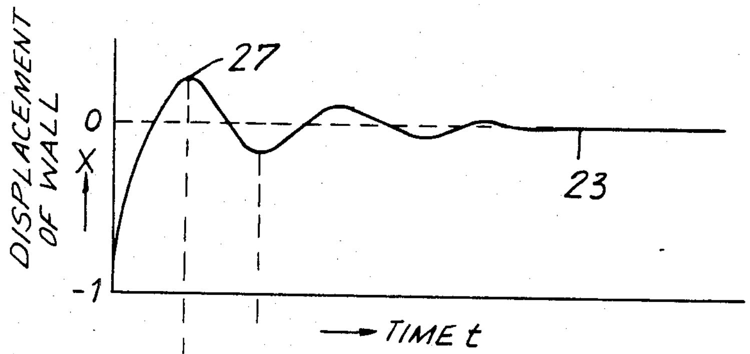
FIG. 7B is a diagram showing the damped oscillation of the wall and the piezoelectric element of the ink jet printer head in accordance with this invention.

When the pulse interval T between the instantaneous times $t_1$ and $t_2$ is selected to be sufficiently long as indicated in FIG. 7A, the wall 5 and piezoelectric element 9 undergo damped oscillations indicated by the curve 23 of FIG. 7B. As illustrated in FIGS. 7A and 7B, the time T is sufficiently long to allow the oscillations 23 to be dampened out. The damped oscillation 23 is closely represented by the following equation:

$$X = -\beta e_{-nt} \sin(\omega t - \theta)$$

where X represents the displacement of the wall 5 and of the piezoelectric element 9 in the direction as indicated in FIG. 5. That is, X=0 is the displacement of the wall 5 and the piezoelectric element 9 when the pulse width T is infinitely long. This is the displacement which occurs when there is no voltage applied to the piezoelectric element 9. A displacement X=−1 is the displacement when a voltage is applied to the piezoelectric element 9. The abscissa t represents time and the instantaneous time $t_1$ represents times zero or the reference instantaneous time. $\beta$, n, $\omega$ and $\theta$ are constants which are defined by the elastic coefficients and internal resistances of the wall 5 and the piezoelectric element 9, the fluid mass or impedance in the vicinity of each of the nozzle 3 and the supply port 4, and the surface tension of the ink 6 in the vicinity of the opening 3*a* of the nozzle.

Although the wall 5 and the piezoelectric element 9 finally reach the state X=0 during the time period between $t_1$ and $t_2$, that is, the time period when the volume of the pressure chamber 2 is increasing, the wall 5 and piezoelectric element 9 undergo damped oscillation with reference to the condition X=0 as shown in FIGS. 7B. The damped oscillation 23 is a transient resonance of an oscillation system composed of the wall 5, piezoelectric element 9 and the ink, for a voltage having a waveform as shown in FIG. 7A which has been applied to the piezoelectric element 9. The damping oscillation reflects a delay in time which is represented by the constant $\theta$ in the above equation.

As the wall 5 and the piezoelectric element 9 undergo the above described damped oscillation 23, ink 6 in the vicinity of the nozzle 3 undergoes a similar oscillatory movement. This motion of the ink 6 can be observed through variations with time in the amount 20 of air drawn through the opening 3*a* of the nozzle 3 as indicated in FIGS. 5A and 5B. The amount 20, that is, the distance from the opening 3*a* to the meniscus with the ink 6 of drawn-in air, also undergoes a damped oscillation as shown with the curve 22 of FIG. 7C before the flow of air ceases. The instantaneous time $t_3$, when the amount 20 of the drawn air is a maximum, coincides substantially with the instantaneous time when the displacement X of the piezoelectric element 9 reaches its maximum value 27.

Figure 7C:
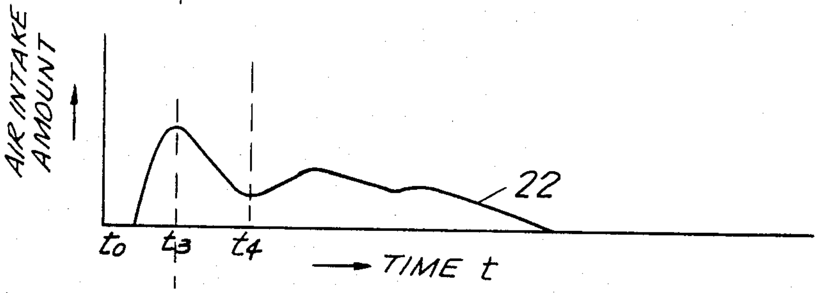
FIG. 7C is a diagram showing variations with time of the flow rate of air which is drawn in through the opening of the nozzle in the ink jet printer head in accordance with this invention.
Figure 7D:
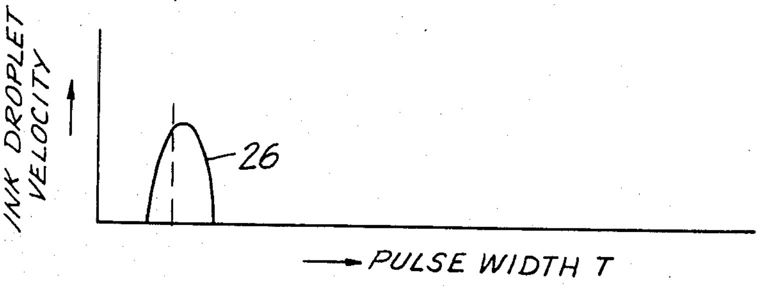
FIG. 7D is a diagram showing variations in the velocity of ink droplets ejected from the nozzle of the ink jet printer head in accordance with this invention, versus variations in the driving pulse width T of FIG. 7A.

When a supply voltage 25 (FIG. 3), which is applied to the piezoelectric element 9, is set to a selected value, the pulse width T in FIG. 7A is gradually reduced. FIG. 7D is a graph showing the variations in the speed of the ejected ink droplets corresponding to the pulse width T. As the curve 26 shows, when the pulse width T is long, no ink droplets 21 are jetted from the nozzle 3. However, when the pulse width T is set near the time, that is, from $t_0$ through $t_3$, ink droplets 21 are jetted from the nozzle 3. The jet velocity of the ink droplet becomes a maximum when the pulse width T is set approximately to the time $[t_3 - t_0]$, but somewhat larger (FIG. 7D).

If a low supply voltage 25 (FIG. 3) is applied to the piezoelectric element 9 after the damped oscillation 23 of the wall 5 and the piezoelectric element 9 has settled to X=0, that is, when the pulse width T is long, then the states of the wall 5 and piezoelectric element 9 are not changed from X=0 to X=−1 with a sufficient velocity at which the ink droplets 21 are ejected from the nozzle opening 3*a*. On the other hand, when the voltage is applied to the piezoelectric element 9 approximately at the instantaneous time $t_3$, then the displaced states of the wall 5 and piezoelectric element 9, turning toward $X=-1$, are such that the damped oscillation 23 following the instantaneous time $t_3$ (which oscillation occurs when the pulse width T is sufficiently long) is superimposed on the return from $X=0$ to $X=-1$. Accordingly, the energy of the damped oscillation 23 in the time period between the instantaneous times $t_3$ and $t_4$ is added to the transition effect due to voltage change in the approach to $X=-1$ of the condition of the wall 5 and piezoelectric element 9. By this superposition of the mechanical oscillation onto the electrically induced motion, the wall 5 and the piezoelectric element 9 is shifted to the state $X=-1$ at a higher velocity then occurs in a transition from $X=0$ to $X=-1$ from a non-oscillating condition. With a properly phased superposition, ink droplets 21 are properly ejected from the nozzle opening 3*a*.

The pulse width T is selected in accordance with the period of damped oscillation 23 which occurs when the ink 6 is drawn into the pressure chamber, as described above. Thus, a desired preselected velocity of ink droplets is achieved with a low voltage applied to the piezoelectric element 9. It should be noted that because there is no damped oscillation 23 existing at the time when the power source is first connected, there is no ink droplet ejected even when the wall 5 is deformed into the pressure chamber 2.

After an ink droplet 21 has been ejected, the damped oscillation of the system comprising the wall 5, piezoelectric element 9 and ink 6 returns to a rest position as a result of the discharge of the ink droplet 21 from the nozzle 3 and the entry of ink into the interior of the chamber 2 from the supply port 4. Accordingly, the next ejection of an ink droplet is not greatly affected by the damped oscillation from the previous ejection. Accordingly, the frequency response of the device is good and ejections may follow closely, one on the other.

As described above, a voltage having the same polarity as the polarity of the desired polarization voltage is first applied to the piezoelectric element 9. In response to the application of this voltage, the wall 5 is displaced inwardly to thereby decrease the volume of the pressure chamber 2. In accordance with this embodiment, application of the voltage to the piezoelectric element 9 is stopped when printing is required by the ejection of a droplet. Then, the volume of the pressure chamber 2 is rapidly increased to thereby intake ink 6 to the chamber 2. This intake phase induces the oscillations of walls and ink described above. Then, the voltage is applied again approximately at the time that the damped oscillation of the oscillating system comprising the element 9, wall 5 and ink 6 is near the peak value 27 of displacement. This maximum displacement occurs when the flow rate of ink 6 drawn in is maximum. It should be noted in FIG. 7B that the displacement 27 indicates an enlargement of the pressure chamber 2 beyond the volume which the chamber 2 has when no voltage is applied and no oscillation is present. By the proper timing of the second application of voltage to the piezoelectric element 9, droplets 21 can be ejected using a low voltage signal.

The damped oscillation 23, being a transient mechanical response of the piezoelectric element 9 essentially involves a delay of time. Therefore, with a view to the efficiency of the device, it is desirable that the pulse width T be determined by changing the voltage approximately at the time of occurrence of the maximum value 27 of the damped oscillation 23. Thus, a pulse width T set equal to half of the period of the resonant frequency of the piezoelectric element 9, wall 5 and ink 6 provides a satisfactorily efficient operating point. However, as indicated in FIG. 7D, a pulse width T which coincides with a time somewhat greater than that of the period of the resonant oscillation frequency is also highly efficient in ejecting ink.

In accordance with this embodiment of an ink jet printer head, utilization of the characteristics of the damped oscillation 23 makes it possible to drive the ink jet head at a highly efficient operating point. Because the polarity of the voltage to be applied to the piezoelectric element 9 is the same as that of the polarization voltage of the piezoelectric element 9, there is no depolarization problem of the element 9. Further, since the voltage application of the element 9 is always made in one polarity, the drive circuit for applying the voltage is considerably simplified and thus, is inexpensive to produce.

As described above, the ink jet printer head in accordance with this invention, is driven at a highly efficient operating point by merely selecting a suitable pulse width T. Therefore, even when the oscillating system comprising the piezoelectric element 9, wall 5 and ink 6 is varied such that the time at which the damped oscillation 23 has its peak value 27 is also varied, it is still possible to drive the element with the desired high efficiency by changing the pulse width T correspondingly. This capability of adjusting for most efficient droplet ejection by adjusting pulse width T is a very important advantage of the ink jet printer head in accordance with this invention over a device using a transformer voltage converter which requires a very complicated procedure including changes of the primary winding as well as the secondary winding to accomodate such variations in oscillation.

FIG. 8 shows an alternative circuit for driving the piezoelectric element 9, which as described above, acts as a capacitor in the circuit. In FIG. 8, prior to the instantaneous time $t_1$, a transistor 30 is non-conductive (OFF) and a transistor 31 is conductive (ON). As a result, the voltage 32 across the piezoelectric element 9 becomes substantially the same as the source voltage 25 due to current flow through the transistor 31 which charges the capacitor 9. During a pulse interval T, that is, between time $t_1$ and $t_2$, the transistors 30,31 are turned ON and OFF respectively, that is, their state is reversed from the time prior to $t_1$. As a result, the charge stored in the piezoelectric element 9 flows as a current through the resistor 13 in the direction indicated by the arrow B.

When the input signal 16 goes low after the period T at the time $t_2$, the transistor 30 and the transistor 31 are non-conductive (OFF) and conductive (ON) respectively again. As a result, the piezoelectric element/capacitor 9 is charged through the transistor 31.

Because current flows through the resistor 13 only during the period T very little electrical power is consumed thereby. The circuit of FIG. 8 is much simpler in construction than that in FIG. 3 and provides the same waveform for driving the piezoelectric element 9.

In the above described embodiments, the piezoelectric element 9 is first deformed such that the volume of the pressure chamber 2 is decreased and then the volume is returned to the original state to intake ink. Immediately after, the volume is decreased again to jet the ink droplet from the nozzle 3. However, it is also possible to operate the head in such a manner that, on demand for printing, the piezoelectric element 9 is first formed to increase the volume of the pressure chamber 2 by applying a predetermined voltage, namely, a voltage having the opposite polarity as the polarization voltage of the element 9. Thereby, there is an inflow of ink to the enlarged pressure chamber 2. When ink is to be ejected from the nozzle 3, the voltage is removed in synchronization with a damped oscillation of a vibrating system as described hereinafter. In such an embodiment, the piezoelectric element 9 is connected directly across the collector-emitter of a transistor 15 as in FIG. 9. The polarities of the input signal 16 and the voltage waveform 19 of FIGS. 4B and 7A are reversed and given reference numerals 16' and 19' in FIGS. 9,10A and 10B. Operation of the circuit is explained and will be clear for those skilled in the art.

Although a depolarization problem may exist in this embodiment, it still provides an advantage that the driving voltage of the piezoelectric element 9 is always in one polarity. Thus, the driving circuit for the piezoelectric element 9 is simple and efficient in operation due to the utilization of the damped oscillation characteristics.

FIG. 9 shows the drive circuit for supplying electrical pulses to the piezoelectric element 9 and FIGS. 10A and 10B show the waveforms of an input signal 16' applied to the drive circuit of FIG. 9 and of a voltage 19' produced across the piezoelectric element 9. This voltage 19' corresponds to the voltage between the circuit points indicated by the reference numeral 24 of FIG. 9.

At the instantaneous time $t_1$, a transistor 11 and a transistor 12 are rendered conductive (ON) in coincidence with the fall 17' of the input signal 16'. As a result, current flows in the direction of the arrow A to charge the piezoelectric element/capacitor 9 through the transistor 12 and a charging resistor 13. The resultant waveform of voltage 19', applied to the piezoelectric element 9, is shown in FIG. 10B.

At the instantaneous time $t_2$, the input signal 16' rises as indicated by the trailing edge 18'. In response to this change in the signal, a transistor 14 which was ON during the period T is rendered non-conductive (OFF) while a transistor 15, which during the period T was non-conductive, is rendered conductive (ON). As a result, the charge stored in the piezoelectric element 9 flows instantly as a current in the direction of the arrow B through the transistor 15 and the piezoelectric element/capacitor 9 is instantaneously discharged.

The mechanical/hydraulic operation which accompanies the above described electrical operation is described with reference to FIGS. 11A and 11B. At the instantaneous time $t_1$, charging of the piezoelectric element 9 begins, causing it to expand radially. Because the piezoelectric element 9 is bonded to the wall 5, as described above, the radial expansion of the piezoelectric element 9 raises the wall 5 in such a manner that the wall 5 becomes substantially conical thereby increasing the internal volume of the pressure chamber 2. In this operation, ink 6 from the ink container 7 (FIG. 1) is drawn in through the supply port 4 while air is drawn into the opening 3*a* in the nozzle 3. As a result, the conditions shown in FIGS. 11A and 11B are reached. The meniscus between the ink 6 and the air in the nozzle 3 is recessed from the outlet opening 3*a* by a distance 20. When the instantaneous time $t_2$ is selected so that it occurs approximately when the amount 20 of drawn-in air is a maximum, the wall 5 and piezoelectric element 9 are quickly restored to the condition shown in FIG. 12.

This results from both the discharge of electrical energy stored in the piezoelectric element 9 and also from the elastic energy which is stored in the wall 5 and piezoelectric element 9 when they are originally flexed during the period T. As a result of the unflexing of the wall 5 and piezoelectric element 9, ink 6 is discharged from the opening 3*a* in the nozzle 3 in the form of an ink droplet. It should be understood that the same types of oscillation as indicated in FIGS. 7B and 7C occur in the wall 5 and ink 6 when the voltage pulse is applied to expand the pressure chamber 2. Thus, the moment for termination of the applied voltage can be selected for a time $t_2$ to produce a period T which synchronizes the electrically induced motion with the mechanically/hydraulically induced motion to provide efficient ejection of a droplet without using a high voltage.

In the embodiment of FIG. 9, electrical energy is not consumed at a high level because the piezoelectric element 9 is not supplied with a voltage during a time other than when the chamber is being expanded, that is, during the period T. Even when the electrical power is ON in a printer using an ink jet printer head in accordance with this invention, should a person's hands inadvertently touch the piezoelectric element 9, for example, when exchanging a recording sheet during non-printing, there is no hazard because the piezoelectric element 9 is not supplied with voltage.

Figure 13:
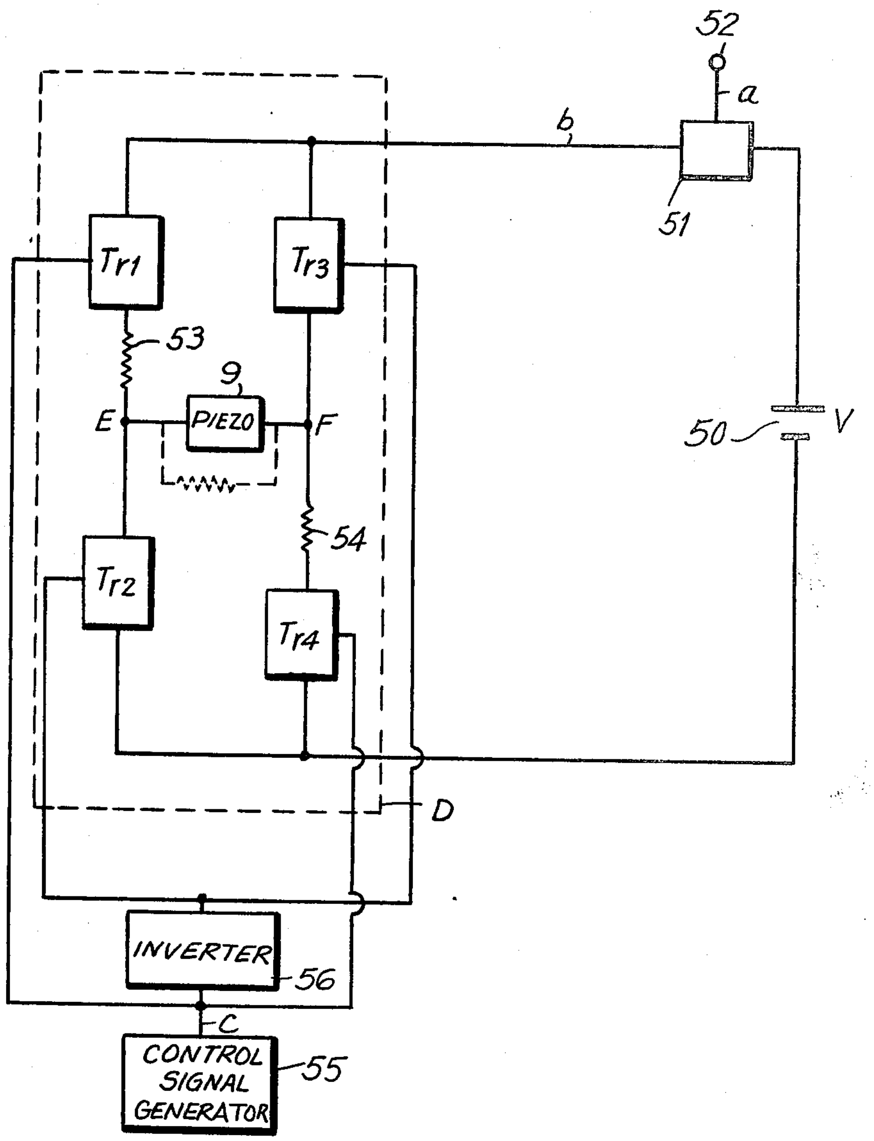
FIG. 13 is a semi-schematic diagram of an alternative embodiment of a driving circuit for an ink jet printer head in accordance with this invention.

FIG. 13 shows another alternative embodiment of a drive circuit for the piezoelectric element 9 in an ink jet printer head in accordance with this invention. This drive circuit can be effective when the element 9 is to be driven with a low voltage. Although operation of the circuit in FIG. 13 should also be clear to those skilled in the art, it is briefly described with reference to FIG. 14 which shows waveforms at various points in the circuit.

A switch 51 is turned ON by application of a suitable signal to its control terminal 52 thereby allowing the source voltage V to be applied across a circuit D which comprises transistors $Tr_1$ to $Tr_4$, resistors 53,54 and the piezoelectric element 9. As in the other circuit embodiments, the piezoelectric element 9 represents a capacitor in the circuit and a leakage resistance of large value is shown in broken lines. The transistors $Tr_1$ and $Tr_2$ are connected in series through the resistor 53, and the transistors $Tr_3$ and $Tr_4$ are connected in series to the resistor 54. The piezoelectric element 9 is connected between points E and F.

A control signal generator 55 is provided which produces bi-directional biasing signals according to a demand for printing. An output of the generator 55 is directly connected to the bases of the transistors $Tr_1$ and $Tr_4$, and through an inverter 56 to the bases of the transistors $Tr_2$ and $Tr_3$. Therefore, when the transistors $Tr_1$ and $Tr_4$ are turned ON, the transistors $Tr_2$ and $Tr_3$ are turned OFF and vice versa.

Figure 14:
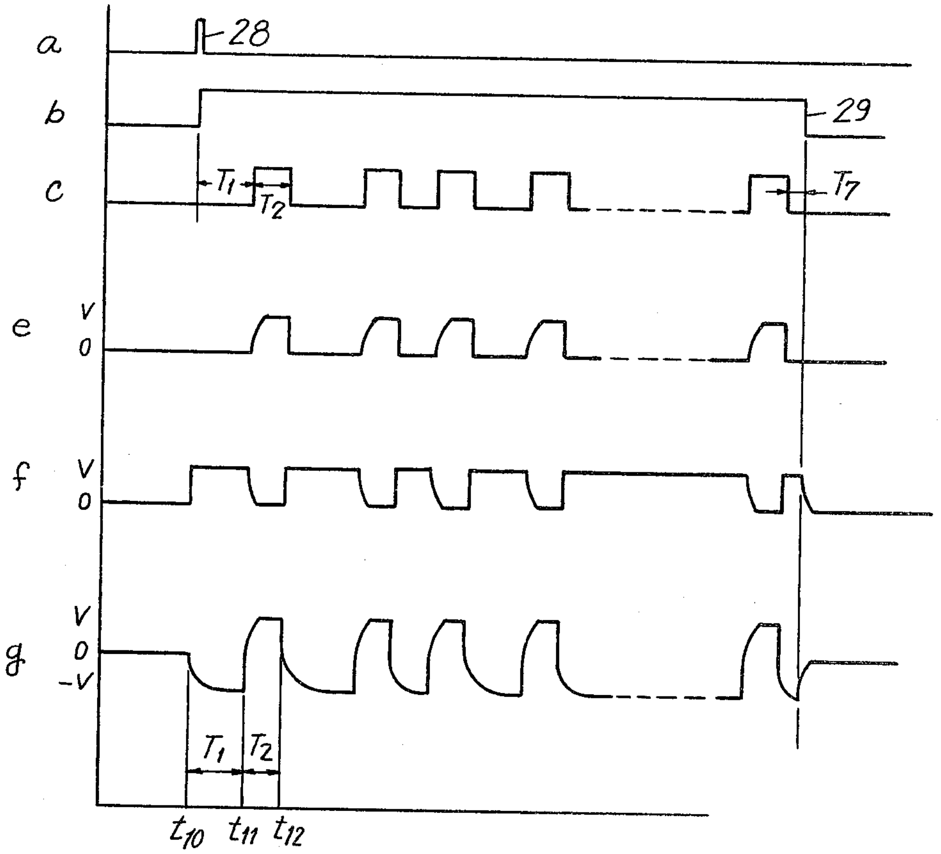
FIG. 14 shows waveforms associated with the operation of the circuit of FIG. 13.

When the switch 51 is closed by application of a signal (FIG. 14, curve a) to the control terminal 52, the voltage source 50 is connected in circuit to apply the source voltage V across the circuit D as shown by the waveform 6 of FIG. 14.

Under this condition, when a demand for actual printing occurs, the signal generator 55 is actuated (by means not shown), to produce positive and negative outputs, as shown by waveform c in FIG. 14. Assuming that during a period $T_1$ there is no demand for printing. The polarity of the output of the generator 55 is such that the transistors $Tr_2$ and $Tr_3$ are turned ON. A current flows through the transistor $Tr_3$, the piezoelectric element 9 and the transistor $Tr_2$, so that the voltages at the points E and F are as shown by waveforms e and f, respectively (FIG. 14).

These waveforms cause the piezoelectric element 9 to be deformed in one direction. Then, when a demand for printing occurs as indicated by the signal c going high, that is, the polarity of the output c of the generator 55 is reversed for a period T2, the voltages at these points E,F become V and O, respectively. Thus, the piezoelectric element 9 is deformed in the other direction. Therefore, the amount of the deformation of the piezoelectric element 9 is doubled as shown by the waveform g in FIG. 14, where it can be seen that the voltage across the piezoelectric element 9 swings between the levels of −V and V. When a certain amount of voltage change, and corresponding deflection of the piezoelectric element produces the desired ink droplet discharge, the source voltage V can be less when a circuit of FIG. 13 is used than when the circuits of FIGS. 3,8 and 9 are used.

Furthermore, in accordance with the method and apparatus of an ink jet printer head of this invention, the ink jet head is driven with a high efficiency merely by selecting the proper pulse width T. Accordingly, even when the oscillation system comprised of the piezoelectric element 9, wall 5 and ink 6 varies, and the position of the maximum value of displacement 27 of the damped oscillation 23 also varies, the ink jet head can nonetheless still be adjusted for efficient driving of the head by adjusting the pulse width T. On the other hand, if a voltage transformer is used as in the prior art, it is necessary to change the connections of the primary and secondary windings thereof. This is an intricate and troublesome procedure.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for operating a demand type jet printer head, said printer head including a pressure chamber, a nozzle, one end of said nozzle communicating with said pressure chamber, a flow path connecting said pressure chamber to an ink supply, electro-mechanical conversion means, said conversion means being operatively coupled for altering the internal volume of said pressure chamber by elastically deforming a wall of said pressure chamber, and a driver circuit for selectively driving said electro-mechanical conversion means, comprising the steps of:

(a) generating an electrical driving voltage in said driver circuit;

(b) applying said driving voltage to said electro-mechanical conversion means to outwardly displace said wall of said pressure chamber from a standby position to increase the internal volume of said pressure chamber, elastic energy being stored in said electro-mechanical conversion means and said wall, said increasing volume of said pressure chamber reducing chamber pressure and drawing ink from said ink supply into said pressure chamber, said alteration of chamber volume and ink flow to said pressure chamber inducing a damped periodic mechanical/hydraulic oscillation in a portion of said print head comprising said pressure chamber wall, said electro-mechanical conversion means and said ink, said damped oscillation of itself being of insufficient energy to eject ink from said nozzle at such a speed that the ink can reach a recording medium;

(c) suspending application of said electrical driving voltage to said electro-mechanical conversion means, said driver circuit being adapted to suspend said electrical driving voltage in synchronization with the reduction in chamber volume caused by said damped oscillation of said printer head portion, said interruption of said electrical driving voltage releasing said stored elastic energy, and causing said electro-mechanical means to inwardly displace, the energy of said damped oscillation in combination with said inward displacement abruptly restoring said wall of said pressure chamber to said standby position, an ink droplet being ejected from said nozzle.

2. The method as claimed in claim 1, wherein the time of application of said driving voltage exceeds one-half of the period of said oscillation.

3. A method for operating a demand type jet printer head, said printer head including a pressure chamber, a nozzle, one end of said nozzle communicating with the atmosphere and the other end communicating with said pressure chamber, a flow path connecting said pressure chamber to an ink supply, electro-mechanical conversion means, said conversion means being operatively coupled for altering the internal volume of said pressure chamber by elastically deforming a wall of said pressure chamber, and a driver circuit for selectively driving said electro-mechanical conversion means, comprising the steps of:

(a) generating a first electrical driving voltage in said driver circuit;

(b) applying said first driving voltage to said electro-mechanical conversion means to inwardly displace said wall of said pressure chamber from a standby position to decrease the internal volume of said pressure chamber, displacement of said conversion means and wall due to application of said first voltage being elastic and storing energy in said conversion means and wall;

(c) discontinuing said first driving voltage to release said stored elastic energy, said conversion means, wall and ink moving so as to increase said internal chamber volume as a result of said elastic displacement, said increasing pressure chamber volume reducing chamber pressure and drawing ink from said ink supply into said pressure chamber and inducing a damped periodic mechanical/hydraulic oscillation of said conversion means, wall and ink, said damped oscillation being of insufficient energy to eject ink from said nozzle at such a speed that ink can reach a recording medium;

(d) applying a second driving voltage to said electro-mechanical conversion means to again inwardly displace said wall of said pressure chamber to decrease the internal volume of said pressure chamber, said driving voltage being applied in synchroelectro-mechanical conversion means operatively coupled for elastically deforming a wall of said pressure chamber;

means for selectively supplying a voltage signal to said electro-mechanical conversion means with a polarity to elastically displace said wall of said pressure chamber outwardly to expand the volume of said pressure chamber from a standby condition, elastic energy being stored in said wall and conversion means, thereby to draw ink into said pressure chamber from supplying means, said signal supplying means being adapted to suspend application of said voltage signal to said electro-mechanical conversion means in synchronism with the damped oscillation of a mechanical system formed by said pressure chamber wall, said electro-mechanical conversion means and said ink, said damped oscillation being the result of said chamber expansion, and being of insuffient energy of itself to eject ink from said nozzle, said suspension of said voltage signal occurring at such a time that said wall of said pressure chamber is abruptly restored to said standby position by said elastic energy stored in said wall of said pressure chamber and electro-mechanical conversion means, an ink droplet being ejected from said nozzle after supplying and suspending said voltage signal.

19. The ink jet printer head as claimed in claim 18, wherein said signal supplying means suspends application of said voltage signal to said electro-mechanical conversion means approximately at a time when displacement of said damped oscillation reaches a maximum value thereof.

20. The ink jet printer head as claimed in claim 18, wherein said signal supplying means suspends application of said electrical signal to said electro-mechanical conversion means approximately at a time when the flow of air into said pressure chamber is at a maximum value thereof.

21. The ink jet printer head as claimed in claim 13 or 18, wherein said signal supply means includes a voltage source and a first transistor switch means connected across input terminals of said electro-mechanical conversion means; a second transistor switch means coupled in series with said terminals of said electro-mechanical conversion means and said voltage source; and circuit means for driving said first and second transistor switch means with opposite phases in response to an input signal.

22. The ink jet printer head as claimed in claim 13 and 18, wherein said signal supply means includes a transistor driver circuit having an output transistor with input terminals of said electro-mechanical conversion means coupled directly across the collector-emitter of said output transistor.

23. A method for operating a demand-type ink jet printer head, said ink jet printer head having a pressure chamber of a predetermined volume, a nozzle, one end of said nozzle communicating with the atmosphere and the other end of said nozzle with said pressure chamber; means for supplying ink to said pressure chamber; an electro-mechanical conversion means operatively coupled for deforming a wall of said chamer; and driver means for selectively driving said electro-mechanical conversion means, comprising the steps of:

(a) applying an electrical signal from said driver means of a first polarity to said electro-mechanical conversion means to displace said wall of said pressure chamber inwardly to decrease the volume of said pressure chamber;

(b) applying a signal from said driver means of a second polarity, said second polarity being opposite to said first polarity, said electrical signal of said second polarity being applied to said electro-mechanical conversion means to displace said wall of said pressure chamber outwardly to increase the volume of said pressure chamber and thereby draw ink into said pressure chamber from said ink supplying means, said increase in volume inducing a damped oscillation of the mechanical system formed by said wall of said pressure chamber, said electro-mechanical conversion means and said ink, said damped oscillation being of insufficient energy to eject ink from said nozzle;

(c) changing said second polarity signal to said first polarity signal and applying said first polarity signal to said electro-mechanical conversion means in synchronization with said oscillation at such a time that said wall of said pressure chamber is abruptly restored inwardly to thereby jet ink droplets from said nozzle by additive combination of oscillation energy and wall restoration energy.

24. The ink jet printer head comprising:

a pressure chamber of predetermined volume;

a nozzle, one end of said nozzle communicating with the atmosphere and the other end of said nozzle communicating with said pressure chamber;

means for supplying ink to said pressure chamber;

electro-mechanical conversion means operatively coupled for deforming a wall of said pressure chamber;

means for selectively supplying a voltage signal to said electro-mechanical conversion means with a polarity to displace said wall of said pressure chamber outwardly to expand the volume of said pressure chamber from a standby condition, thereby to draw ink into said pressure chamber from said supplying means, said signal supplying means being adapted to reverse the polarity of said voltage signal to said electro-mechanical conversion means in synchronism with the damped oscillation of a mechanical system formed by said pressure chamber wall, said electro-mechanical conversion means and said ink, said damped oscillation being the result of said chamber expansion and being of insufficient energy to eject ink from said nozzle, said reversal of said voltage signal occurring at such a time as to be super-posed on the elastic energy stored in said wall of said pressure chamber and said electro-mechanical conversion means during said expansion, said energy and said reversed polarity signal reducing the volume of said pressure chamber from said standby condition, an ink droplet being ejected from said nozzle.

25. The ink jet printer head as claimed in claim 24, wherein said means for selectively supplying a voltage signal includes a first pair of transistors in series across a voltage source, and a second pair of series transistors across said voltage source, said electro-mechanical conversion means being connected between the transistors of said first pair and transistors of said second pair, and switching means, said switching means being adapted to connect said electro-mechanical conversion means alternately in series with one transistor from said first pair and one transistor from said second pair, and the other transistor of said first pair and the other transistor of said second pair, whereby an AC signal is provided across said electro-mechanical conversion means, said signal having an amplitude greater than the voltage of said voltage source.

* * * * *